United States Patent
Bae et al.

(10) Patent No.: US 11,357,333 B2
(45) Date of Patent: *Jun. 14, 2022

(54) WEARABLE CHAIR WITH TRUSS STRUCTURE

(71) Applicants: Hyundai Motor Company, Seoul (KR); Kia Corporation, Seoul (KR)

(72) Inventors: Ki Hyeon Bae, Yongin-si (KR); Kyung Mo Jung, Seongnam-si (KR); Kyu Jung Kim, Seoul (KR); Ju Young Yoon, Suwon-si (KR); Dong Jin Hyun, Suwon-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/290,654

(22) PCT Filed: Feb. 21, 2019

(86) PCT No.: PCT/KR2019/002151
§ 371 (c)(1),
(2) Date: Apr. 30, 2021

(87) PCT Pub. No.: WO2020/091152
PCT Pub. Date: May 7, 2020

(65) Prior Publication Data
US 2021/0368991 A1 Dec. 2, 2021

(30) Foreign Application Priority Data
Nov. 2, 2018 (KR) .......................... 10-2018-0133329

(51) Int. Cl.
*A61G 5/14* (2006.01)
*A47C 9/10* (2006.01)
*A47C 13/00* (2006.01)

(52) U.S. Cl.
CPC .................................... *A47C 13/00* (2013.01)

(58) Field of Classification Search
CPC .. A47C 9/025; A47C 9/10; A61G 5/14; A61H 2201/1633
See application file for complete search history.

(56) References Cited

U.S. PATENT DOCUMENTS

| 2,173,569 A | 9/1939 | Troendle |
| 4,138,156 A | 2/1979 | Bonner |

(Continued)

FOREIGN PATENT DOCUMENTS

| CN | 104970607 A | 10/2015 |
| CN | 106859122 A | 6/2017 |

(Continued)

*Primary Examiner* — Shin H Kim
(74) *Attorney, Agent, or Firm* — Slater Matsil, LLP

(57) ABSTRACT

Proposed is a wearable chair with a truss structure, the wearable chair including: an upper rod extending in a longitudinal direction thereof and connected to a wearer's thigh; a lower rod extending in a longitudinal direction thereof and connected to a lower leg of the wearer, the lower rod being coupled to a lower end part of the upper rod at an upper end part of the lower rod and being in contact with the ground at a lower end part of the lower rod when the wearer sits; and a support rod slidably coupled to the upper rod at an upper end part of the support rod and rotatably coupled to the lower rod at a lower end part of the support rod to support a compression force between the upper rod and the lower rod in a longitudinal direction of the support rod when the wearer sits.

14 Claims, 9 Drawing Sheets

(56) References Cited

U.S. PATENT DOCUMENTS

| | | | |
|---|---|---|---|
| 10,271,660 B2 | 4/2019 | Gunura et al. | |
| 10,537,459 B2* | 1/2020 | Gunura | A61F 5/0125 |
| 10,987,798 B2* | 4/2021 | Lee | A47C 9/025 |
| 10,993,861 B2* | 5/2021 | Bae | A47C 9/10 |
| 11,142,935 B2* | 10/2021 | Bae | E05F 5/003 |
| 11,172,763 B2* | 11/2021 | Vafi | A61H 3/00 |
| 2013/0320725 A1 | 12/2013 | Conway | |
| 2017/0008164 A1 | 1/2017 | Lee et al. | |
| 2018/0304456 A1* | 10/2018 | Gunura | A61F 5/0125 |
| 2019/0225131 A1 | 7/2019 | Bellamy et al. | |
| 2020/0155390 A1 | 5/2020 | Bae et al. | |
| 2021/0007500 A1* | 1/2021 | Vafi | B25J 9/0006 |

FOREIGN PATENT DOCUMENTS

| | | |
|---|---|---|
| CN | 107252210 A | 10/2017 |
| JP | 5883256 B2 | 3/2016 |
| JP | 5107722 B2 | 4/2017 |
| KR | 100690645 B1 | 3/2007 |
| KR | 20080004603 U | 10/2008 |
| KR | 200471438 Y1 | 2/2014 |
| KR | 101500200 B1 | 3/2015 |
| KR | 20150146169 A | 12/2015 |
| KR | 20160007456 A | 1/2016 |
| KR | 20170006632 A | 1/2017 |
| KR | 20170036894 A | 4/2017 |
| KR | 20170060783 A | 6/2017 |
| KR | 101755806 B1 | 7/2017 |
| KR | 20180083336 A | 7/2018 |
| KR | 20200059360 A | 5/2020 |
| WO | 2017067705 A1 | 4/2017 |
| WO | 2017067706 A1 | 4/2017 |

\* cited by examiner

WEARABLE CHAIR WITH TRUSS STRUCTURE

TECHNICAL FIELD

The present invention relates generally to a wearable chair with a truss structure. More particularly, the present invention relates to a chair which supports a wearer's weight when the wearer sits while wearing the chair.

BACKGROUND ART

Currently, wearable robots used for a variety of purposes, such as assisting the movement of the disabled and the elderly by supporting their muscle strength, for rehabilitation treatment for patients with muscle disease, for military personnel carrying heavy military gear, or for industrial sites in which heavy loads are carried are actively being developed.

Generally, a wearable robot is manufactured by organically combining links performing joint action similar to the joint action of the human body such that the links have a shape capable of being worn on the human body. Such a wearable robot is worn by a user to assist the upper or lower limb muscle strength of the user so that the user can perform a high-load operation that requires a force that exceeds the limit of general human muscle strength without the help of an external machine.

However, an active type wearable robot that assists muscle strength by acting on power has a relatively heavy weight and requires complex control by a controller, so the active type wearable robot has low stability and a limited seating angle.

Accordingly, a passive type wearable chair which can support heavy weight even with light weight of the chair is required. However, in the passive type wearable chair according to the conventional technology, it is difficult to change the seating angle of the chair.

The foregoing is intended merely to aid in the understanding of the background of the present invention, and is not intended to mean that the present invention falls within the purview of the related art that is already known to those skilled in the art.

As a prior art for this, there is (patent document 1) Korean Patent No. 10-1755806 B.

DISCLOSURE

Technical Problem

The present invention has been made keeping in mind the above problems occurring in the prior art, and is intended to propose a wearable chair which can support heavy weight despite being lightweight.

Technical Solution

In order to accomplish the above objectives, the present invention provides a wearable chair with a truss structure, the wearable chair including: an upper rod extending in a longitudinal direction thereof and connected to a wearer's thigh; a lower rod extending in a longitudinal direction thereof and connected to a lower leg of the wearer, the lower rod being coupled to a lower end part of the upper rod at an upper end part of the lower rod such that the lower rod and the upper rod rotate relative to each other around a rotation center thereof, and being in contact with the ground at a lower end part of the lower rod when the wearer sits; and a support rod being slidably coupled to the upper rod at an upper end part of the support rod such that a position of the upper rod at which the upper end part of the support rod is prevented from sliding on the upper rod is changeable, and being rotatably coupled to the lower rod at a lower end part of the support rod so as to support a compression force between the upper rod and the lower rod in a longitudinal direction of the support rod when the wearer sits, wherein as the position of the upper rod at which the upper end part of the support rod is prevented from sliding on the upper rod is changed, a perpendicular line distance between the support rod and the rotation center of the upper rod and the lower rod is changed when the wearer sits.

The upper end part and the lower end part of the support rod may be coupled slidably to the upper rod and rotatably to the lower rod, respectively, such that the upper end part and the lower end part of the support rod are partially inserted into the upper rod and the lower rod, respectively.

The lower rod may be coupled to the upper rod to be rotatable inside the upper rod, and when the lower rod and the upper rod rotate relative to each other in directions folding over each other, the lower rod may be partially inserted into the upper rod while the support rod is partially inserted into the lower rod.

The wearable chair may further include: a switch coupled to the upper rod such that the switch is able to slide in a longitudinal direction of the upper rod and to be held at each of a plurality of positions of the upper rod so as to be prevented from sliding, wherein as the switch is held in the upper rod, the upper end part of the support rod may be supported by the switch, and the support rod may be prevented from sliding.

A coupling protrusion protruding toward the upper rod may be formed at a first end part of the switch, and coupling grooves may be formed at the plurality of positions of the upper rod, whereby when the coupling protrusion is inserted into each of the coupling grooves, the switch may be held in the upper rod such that the switch is prevented from sliding on the upper rod.

The switch may be composed of a body part having the coupling protrusion formed thereon and a rotation part coupled rotatably to the body part, the rotation part having a first bearing formed at a first end part thereof, wherein when the rotation part rotates relative to the body part, the first bearing may be exposed to the protruding direction of the coupling protrusion and the coupling protrusion may be removed from the coupling groove.

A support may be formed at the body part, the support protruding in direction opposite to the protruding direction of the coupling protrusion, and a second end part of the rotation part may extend in an oblique direction to the support, so as the second end part of the rotation part is pressed toward the support, the rotation part may be rotated relative to the body part.

When inserting the coupling protrusion of the switch into the coupling groove of the upper rod, each of magnets producing attraction therebetween may be provided in the switch and the upper rod such that the magnets face each other.

The magnet of the switch may include a plurality of magnets spaced apart from the coupling protrusion, and the magnet of the upper rod may be provided at a position corresponding to each of the plurality of magnets provided in the switch at a position of the switch at which the coupling protrusion of the switch is inserted into the coupling groove of the upper rod.

The wearable chair may further include: a sliding part coupled to the lower rod to slide in a longitudinal direction thereof; a lower leg fixing part coupled directly to the lower leg of the wearer; a first connection part coupled to an upper part of the lower leg fixing part at a first end thereof and coupled rotatably to the sliding part at a second end thereof; and a second connection part coupled rotatably to a lower part of the lower leg fixing part at a first end thereof and coupled rotatably to a lower part of the lower rod at a second end thereof.

The lower rod may have a rail formed thereon in the longitudinal direction thereof such that the sliding part slides in the longitudinal direction of the lower rod along the rail, and may have a first elastic body provided in the lower rod, the first elastic body applying an elastic force to the sliding part in a direction pulling the sliding part downward.

A second elastic body may be provided in the lower rod, the second elastic body being fixed to the lower rod at a first end thereof and coupled to the lower end part of the support rod at a second end thereof and applying a rotating force to the support rod so as to rotate the support rod in the same direction as the unfolding direction of the upper rod relative to the lower rod.

A second bearing may be formed at the upper end part of the support rod, the second bearing being configured to rotate such that the support rod slides along the upper rod.

The second bearing may be coupled to the support rod so as to move inside a pressing groove formed at the upper end part of the support rod such that the second bearing is exposed to an outside of the support rod in a direction toward the upper rod or is inserted into the support rod, and a third elastic body may be provided on the support rod, the third elastic body pressing the second bearing such that the second bearing is exposed to an outside of the upper rod along the pressing groove.

Advantageous Effects

The wearable chair with a truss structure of the present invention can support a heavy weight with a lightweight structure of the chair despite having a changeable seating angle.

In addition, in a case in which when the wearer sits, the lower rod is lowered relative to the lower leg fixing part and the lower end part of the lower rod is in contact with the ground, the lower end part of the lower rod is located to be spaced apart from the wearer's foot due to a four-link structure of the lower rod and the lower leg fixing part, thereby improving seating stability.

In addition, in a wearer's standing posture, the lower end part of the lower rod is maintained to be raised from the ground such that the lower end part of the lower rod is not in contact with the ground, thereby minimizing the interference of the wearer's walking.

MODE FOR INVENTION

Figure 1:
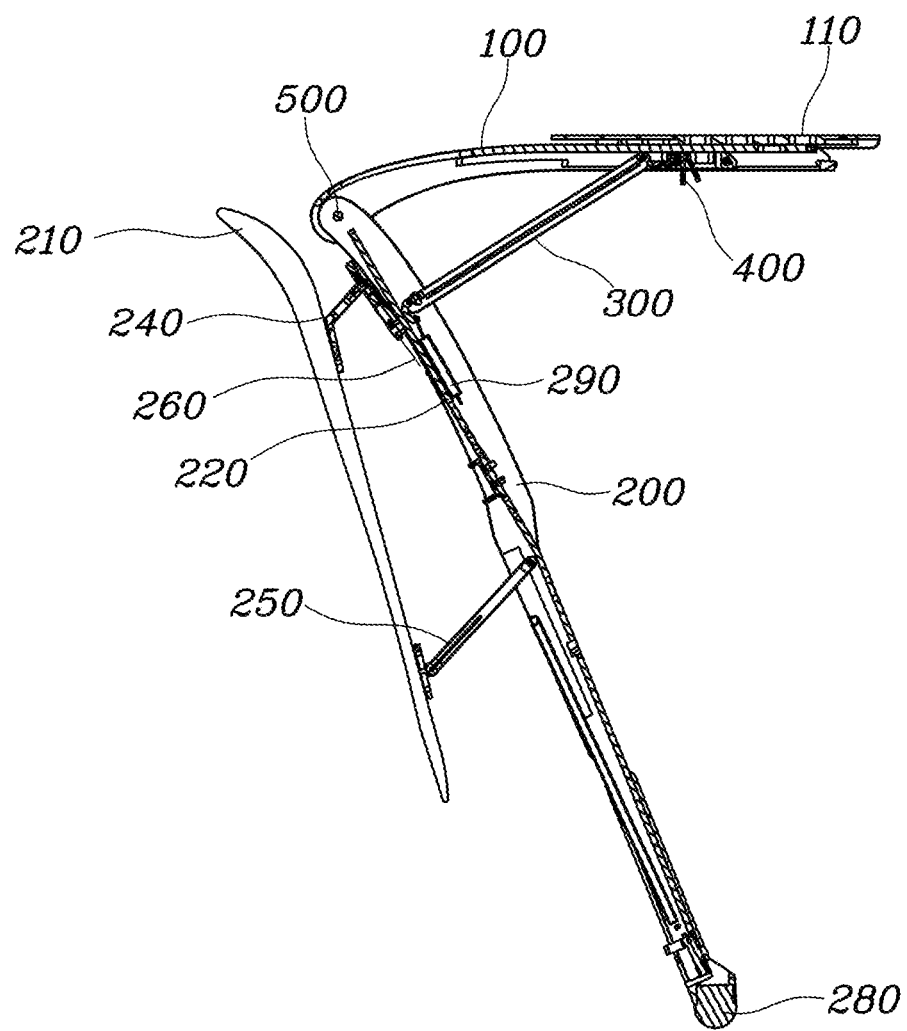
FIG. 1 illustrates a cross-sectional view of a wearable chair with a truss structure according to an embodiment of the present invention.

Specific structural and functional descriptions of the embodiment of the present invention disclosed herein are only for illustrative purposes of the embodiment of the present invention. The present invention may be embodied in many different forms without departing from the spirit and significant characteristics of the present invention. Therefore, the embodiment of the present invention is disclosed only for illustrative purposes and should not be construed as limiting the present invention.

Reference will now be made in detail to the embodiment of the present invention, a specific example of which is illustrated in the accompanying drawings and described below, since the embodiment of the present invention can be variously modified in many different forms. While the present invention will be described in conjunction with the exemplary embodiment thereof, it is to be understood that the present description is not intended to limit the present invention to the exemplary embodiment. On the contrary, the present invention is intended to cover not only the exemplary embodiment, but also various alternatives, modifications, equivalents and other embodiments that may be included within the spirit and scope of the present invention as defined by the appended claims.

It will be understood that, although the terms "first", "second", etc. may be used herein to describe various elements, these elements should not be limited by these terms. These terms are only used to distinguish one element from another element. For instance, a first element discussed below could be termed a second element without departing from the teachings of the present invention. Similarly, the second element could also be termed the first element.

It will be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present. Other expressions that explain the relationship between elements, such as "between", "directly between", "adjacent to", or "directly adjacent to", should be construed in the same way.

The terminology used herein is for the purpose of describing a particular embodiment only and is not intended to be limiting. As used herein, the singular forms "a", "an", and "the" are intended to include the plural forms as well, unless the context clearly indicates otherwise. It will be further understood that the terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinbelow, the exemplary embodiment of the present invention will be described in detail with reference to the accompanying drawings. Throughout the drawings, the same reference numerals will refer to the same or like parts.

Figure 2:
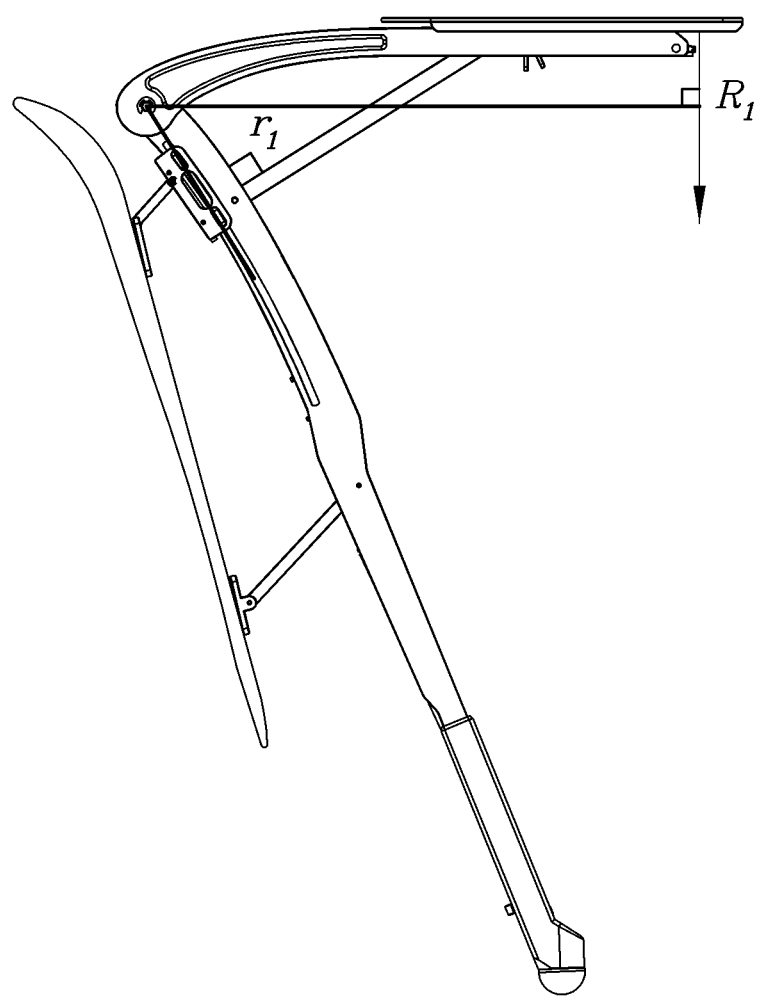
FIGS. 2 to 4 illustrate various seating angles of the wearable chair with a truss structure according to the embodiment of the present invention.
Figure 3:
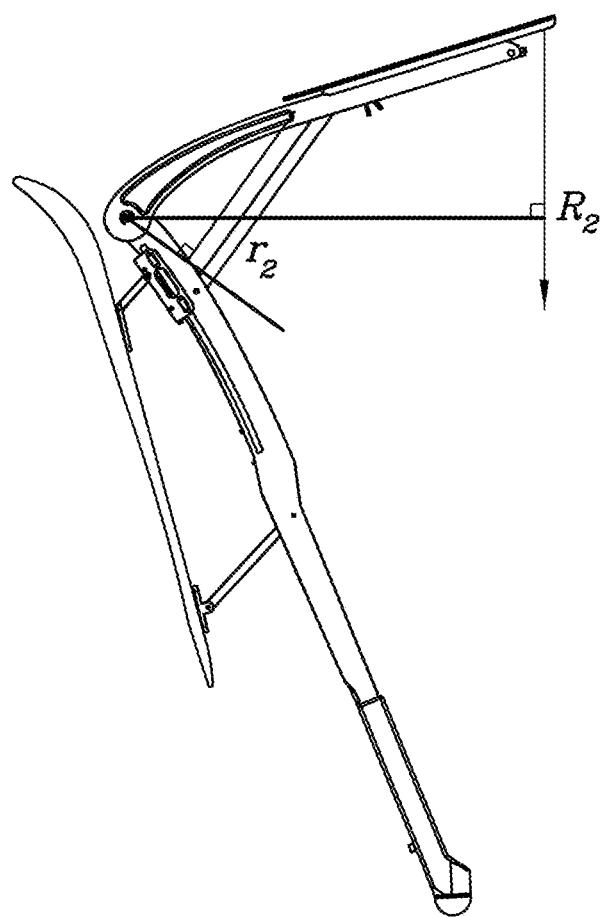
Figure 4:
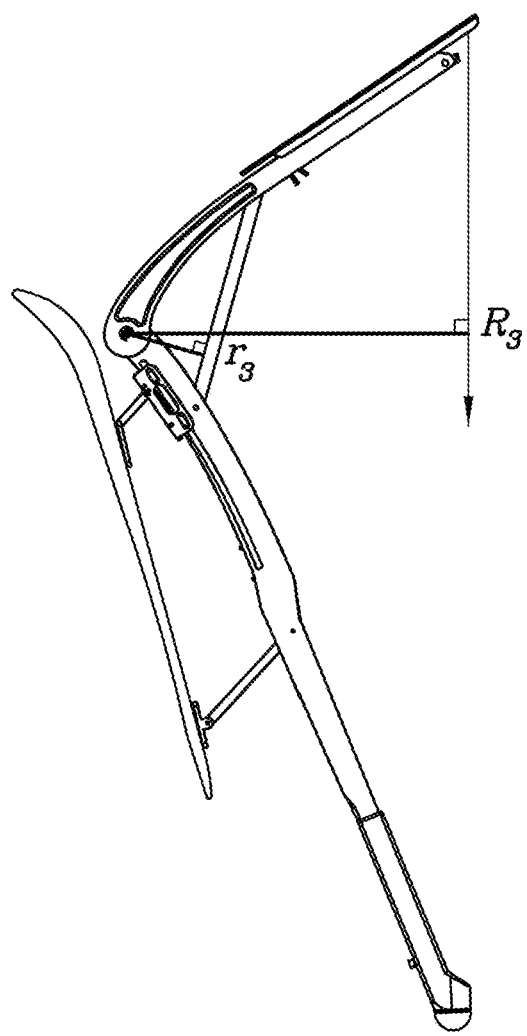

FIG. 1 illustrates a cross-sectional view of a wearable chair with a truss structure according to the embodiment of the present invention, and FIGS. 2 to 4 illustrate various seating angles of the wearable chair with a truss structure according to the embodiment of the present invention.

Referring to FIGS. 1 to 4, the wearable chair with a truss structure according to the embodiment of the present invention includes: an upper rod 100 extending in a longitudinal direction thereof and connected to a wearer's thigh; a lower rod 200 extending in a longitudinal direction thereof and connected to a lower leg of the wearer, the lower rod 200 being coupled to a lower end part of the upper rod 100 at an upper end part of the lower rod such that the lower rod and the upper rod rotate relative to each other around a rotation center 500 thereof, and being in contact with the ground at a lower end part of the lower rod when the wearer sits; and a support rod 300 being slidably coupled to the upper rod 100 at an upper end part of the support rod such that a position of the upper rod at which the upper end part of the support rod is prevented from sliding on the upper rod 100 is changeable, and being rotatably coupled to the lower rod 200 at a lower end part of the support rod so as to support a compression force between the upper rod 100 and the lower rod 200 in a longitudinal direction of the support rod when the wearer sits, wherein as the position at which the upper end part of the support rod 300 is prevented from sliding on the upper rod 100 is changed, a perpendicular line distance between the support rod 300 and the rotation center of the upper rod 100 and the lower rod 200 is changed when the wearer sits.

The upper rod 100 is configured to correspond to the wearer's thigh. The upper rod 100 may be coupled directly to the wearer's thigh by a harness, or may be coupled to a thigh support 110 in close contact with the thigh by the harness such that the upper rod 100 is connected to the wearer's thigh. The upper rod 100 may extend in longitudinal direction parallel to the extending direction of the wearer's thigh.

The lower rod 200 is configured to correspond to the lower leg of the wearer, and may be coupled directly to the lower leg of the wearer through the harness, or may be connected to the lower leg of the wearer through a lower leg fixing part 210 coupled directly to the lower leg of the wearer. The lower rod 200 may extend in the longitudinal direction parallel to the extending direction of the lower leg of the wearer.

The upper end part of the lower rod 200 may be hinged to the lower end part of the upper rod 100 through a rotation center 500 such that the lower rod 200 and the upper rod 100 rotate relative to each other around the rotation center 500.

The lower end part 280 of the lower rod 200 may be in contact with the ground when the wearer sits. Particularly, the lower end part 280 of the lower rod 200 may be located behind the wearer's foot and be in contact with the ground, and may support the wearer's sitting posture. The lower rod 200 has a structure capable of being slid and held and is configured to have length adjustable according to the wearer's height. The lower end part 280 of the lower rod 200 in contact with the ground may be made of a material having high friction such as rubber.

The support rod 300 is coupled rotatably to the lower rod 200 at a lower end part thereof and is coupled slidably to the upper rod 100 at an upper end part thereof. Accordingly, as the upper rod 100 and the lower rod 200 rotate relative to each other, the lower end part of the support rod 300 may rotate relative to the lower rod 200, and the upper end part of the support rod 300 may slide along the upper rod 100.

The upper end part of the support rod 300 is coupled slidably to the upper rod 100 such that the position of the upper rod 100 at which the upper end part of the support rod 300 is prevented from sliding on the upper rod 100 while the upper end part of the support rod 300 slides along the upper rod 100 is changeable. As the position at which the upper end part of the support rod 300 is prevented from sliding is changed, a seating angle which is an angle between the upper rod 100 and the lower rod 200 is changed when the wearer sits.

The upper rod 100, the lower rod 200, and the support rod 300 form a truss structure to have a solid configuration. The upper rod 100 and the lower rod 200 are required to have high rigidity since each of the upper rod and the lower rod receives a bending load, but the support rod 300 receives only a compressive load in an axial direction thereof.

Accordingly, the support rod 300 requires relatively low rigidity, and thus may be made of a lightweight material and have a lightweight structure. Accordingly, during the sliding or rotation of the support rod, the interference of the wearer's free movement may be minimized due to small inertia of the support rod.

Particularly, referring to FIGS. 2 to 4, if a load by the wearer's weight is equally distributed, a distance R1, R2, or R3 from the rotation center to the direction of the load in a direction perpendicular thereto is changed due to the change of the seating angle, so a moment arm is changed due to the load applied to the upper rod 100.

However, the support rod 300 is configured to have the upper end part sliding along the upper rod 100. Accordingly, as the seating angle changes, the perpendicular line distance r1, r2, or r3 between the rotation center of the upper rod 100 and the lower rod 200 and the support rod 300 is changed when the wearer sits. Accordingly, although the moment arm is changed due to the change of the seating angle, the supporting force of the support rod 300 is maintained at the same level. That is, according to the configuration of the present invention, although the seating angle is changed, the wearable chair can support heavy weight with a lightweight structure.

In addition, the upper end part and the lower end part of the support rod 300 may be coupled slidably to the upper rod 100 and rotatably to the lower rod 200, respectively, such that the upper end part and the lower end part of the support rod are partially inserted into the upper rod and the lower rod, respectively. That is, the upper rod 100 and the lower rod 200 may be coupled to the upper end part and lower end part of the support rod 300, respectively, while the upper end part and lower end part of the support rod 300 are covered by the upper rod 100 and the lower rod 200, respectively, by being inserted thereinto.

Accordingly, the support rod 300 is configured to receive the compressive load, and is required to have relatively low rigidity. Accordingly, the support rod 300 is formed to have thickness smaller than the thickness of each of the upper rod 100 and the lower rod 200, so the upper rod 100 and the lower rod 200 may have a folded structure.

Particularly, the lower rod 200 is coupled to the upper rod 100 to be rotatable inside the upper rod 100, and when the lower rod 200 and the upper rod 100 rotate relative to each other in directions folding over each other, the lower rod 200 may be partially inserted into the upper rod 100 while the support rod 300 is partially inserted into the lower rod 200.

That is, when the upper rod 100 and the lower rod 200 rotate in the directions folding over each other, the support rod 300 is partially inserted into the lower rod 200, and the lower rod 200 is partially inserted into the upper rod 100, so the upper rod 100 and the lower rod 200 are configured to have minimum volume while the upper rod 100 and the lower rod 200 are folded over each other.

The wearable chair further includes: a switch coupled to the upper rod such that the switch is able to slide in a longitudinal direction of the upper rod and to be held at each of a plurality of positions of the upper rod so as to be prevented from sliding, wherein as the switch is held in the upper rod, the upper end part of the support rod may be supported by the switch, and the support rod may be prevented from sliding. The switch 400 may slide along the upper rod 100 in direction parallel to or in the same direction as the sliding direction of the upper end part of the support rod 300.

However, the switch 400 may be coupled to the upper rod 100 to be held in the upper rod 100 such that the switch 400 stops sliding at the plurality of positions of the upper rod 100. The switch 400 may be coupled to the upper rod 100 to be held in the upper rod 100 at continuous positions or may be coupled to the upper rod 100 to be held in the upper rod 100 at a plurality of positions spaced apart from each other.

Figure 5A:
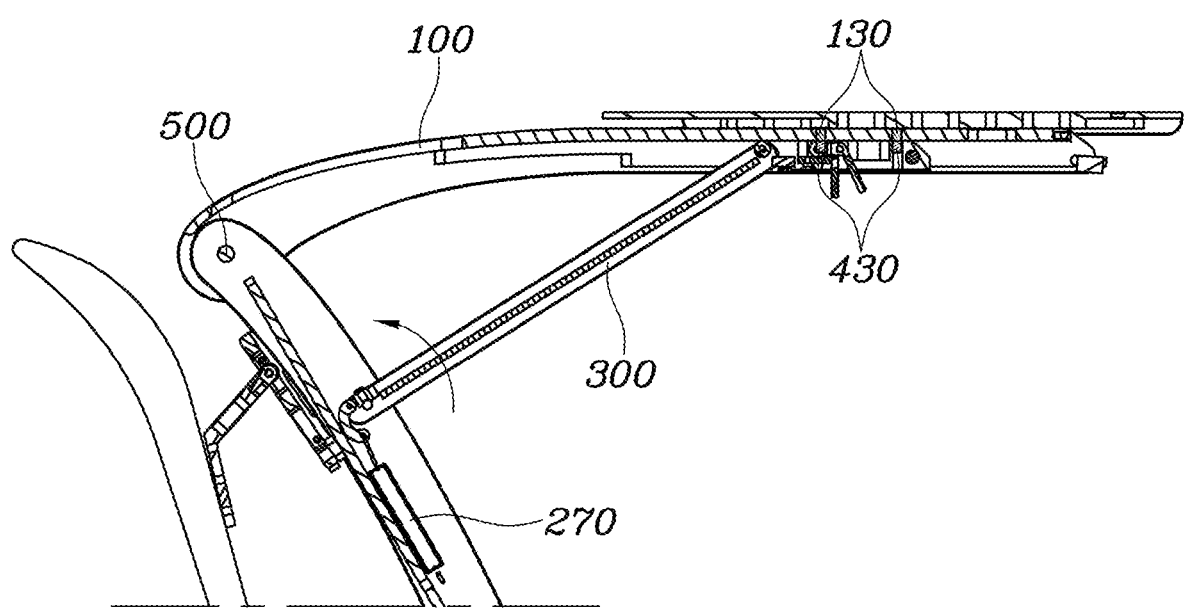
FIGS. 5a and 5b illustrate a coupling relation between an upper rod and a switch of the wearable chair with a truss structure according to the embodiment of the present invention.
Figure 5B:
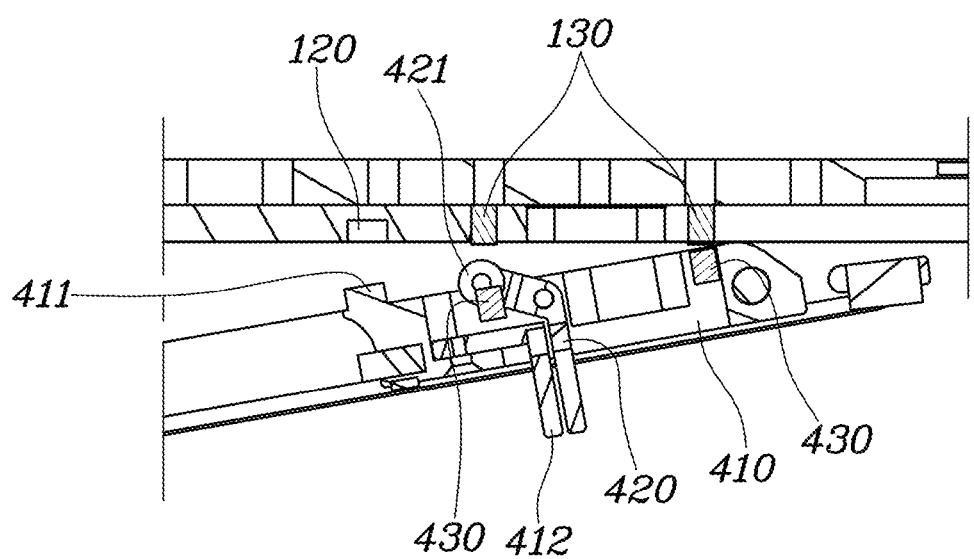

FIGS. 5a and 5b illustrate a coupling relation between an upper rod and a switch of the wearable chair with a truss structure according to the embodiment of the present invention.

Referring to FIGS. 5a and 5b, when the switch 400 is held in the upper rod 100, the support rod 300 is prevented from sliding on the upper rod 100 due to the switch 400, so the relative rotation of the upper rod 100 and the lower rod 200 to each other may stop. As the holding position of the switch 400 changes, an angle at which the relative rotation of the upper rod 100 and the lower rod 200 to each other stops may be changed.

During the sitting of the wearer, the wearer's weight is applied to the upper rod 100. When the angle of the relative rotation between the lower rod 200 and the upper rod 100 is fixed by the support rod 300, the wearer's weight applied to the upper rod 100 is transmitted to the lower rod 200 through the support rod 300.

Accordingly, during the sitting of the wearer, the seating angle which is an angle between the lower rod 200 and the upper rod 100 may be changed as the holding position of the switch 400 changes along the upper rod 100. Accordingly, the wearer can simply change the seating angle.

The switch 400 may be formed to correspond to the shape of the upper end part of the support rod 300. Particularly, the switch 400 may be formed to have a shape covering the upper end part of the support rod 300. That is, as illustrated in the drawings, the switch 400 supporting the rounded upper end part of the support rod 300 may be formed to have the shape covering the upper end part of the support rod 300. Accordingly, the switch 400 may distribute the supporting force of the support rod 300 and be pressed by the distributed supporting force.

A coupling protrusion 411 protruding toward the upper rod 100 is formed at a first end part of the switch 400, and coupling grooves 120 are formed at a plurality of positions of the upper rod 100, whereby when the coupling protrusion 411 is inserted into each of the coupling grooves 120, the switch 400 may be held in the upper rod such that the switch 400 is prevented from sliding on the upper rod 100.

The switch 400 extends in the longitudinal direction of the upper rod 100, and may have the coupling protrusion 411 formed at the first end part of the switch. The coupling grooves 120 may be formed at the plurality of positions of the upper rod 100 spaced apart from each other in the longitudinal direction thereof. The coupling protrusion 411 protrudes toward the upper rod 100 and is inserted into each of the plurality of coupling grooves 120 formed in the upper rod 100. Accordingly, the switch 400 may be securely held in the upper rod 100 such that the switch 400 does not slide along the upper rod 100.

The switch 400 is composed of a body part 410 having the coupling protrusion 411 formed thereon and a rotation part 420 coupled rotatably to the body part 410, the rotation part having a first bearing 421 formed at the first end part thereof, wherein when the rotation part 420 rotates relative to the body part 410, the first bearing 421 is exposed to the protruding direction of the coupling protrusion 411 and the coupling protrusion 411 may be removed from the coupling groove 120.

The body part 410 of the switch 400 may extend in the longitudinal direction of the upper rod 100, and the coupling protrusion 411 may be formed at the first end part of the body part 410. The rotation part 420 has the first bearing 421 formed at a first end part thereof and may be coupled rotatably to the body part 410.

With the coupling protrusion 411 of the body part 410 inserted into the coupling groove 120, the first bearing 421 of the rotation part 420 is inserted into the body part 410. When the rotation part 420 rotates relative to the body part 410, the first bearing 421 is exposed in the protruding direction of the coupling protrusion 411, and the coupling protrusion 411 may be removed from the coupling groove 120. That is, as the rotation part 420 rotates such that the first bearing 421 is exposed in the protruding direction of the coupling protrusion 411, the coupling protrusion 411 is removed from the coupling groove 120.

Accordingly, with the coupling protrusion 411 removed from the coupling groove 120, the first bearing 421 is exposed to the outside and is in contact with the upper rod 100, so the switch 400 can efficiently slide.

A support 412 is formed at the body part 410, the support protruding in direction opposite to the protruding direction of the coupling protrusion 411, and a second end part of the rotation part 420 extends in an oblique direction to the support 412, so as the second end part of the rotation part 420 is pressed toward the support 412, the rotation part 420 may be rotated relative to the body part 410.

The support 412 may be formed to be integrated with or to be securely fixed to the body part 410, and the second end part of the rotation part 420 may extend in the direction opposite to the protruding direction of the coupling protrusion 411 and in the oblique direction to the support 412. That is, the rotation part 420 may be coupled rotatably to the body part 410 at a middle thereof by passing therethrough such that the first end part of the rotation part 420 is exposed in the protruding direction of the coupling protrusion 411 and the second end part thereof extends in the opposite direction to the protruding direction of the coupling protrusion 411.

The second end part of the rotation part 420 extends in the oblique direction to the support 412, and when the second end part of the rotation part 420 is pressed toward the support 412, the rotation part 420 may rotate relative to the body part 410. Specifically, when the first bearing 421 formed on the first end part of the rotation part 420 is inserted into the body part 410, the second end part of the rotation part 420 extends in the oblique direction to the support 412. When the second end part of the rotation part 420 is pressed toward the support 412 and is parallel to the support 412, the first bearing 421 is rotated to be exposed in the protruding direction of the coupling protrusion 411, so the coupling protrusion 411 may be removed from the coupling groove 120.

Accordingly, when the second end part of the rotation part 420 is pressed, the holding of the switch 400 may be simply released, and accordingly, the position change of the switch 400 may be simply performed.

When inserting the coupling protrusion 411 of the switch 400 into the coupling groove 120 of the upper rod 100, a magnet 130 and a magnet 430 producing attraction therebetween may be provided in the upper rod 100 and the switch 400, respectively, such that the magnets 130 and 430 face each other. Particularly, the magnets 130 and 430 may be provided in the upper rod 100 and the switch 400, respectively, such that the N and S poles of the magnets 130 and 430 face each other, so attraction between the upper rod 100 and the switch 400 may be produced.

The magnet 130 and the magnet 430 between which attraction occurs may be provided in the upper rod 100 and the switch 400, respectively. Here, the magnet 430 of the switch 400 and the magnet 130 of the upper rod 100 have relatively weak attraction therebetween, and are intended to induce the insertion of the coupling protrusion 411 of the switch 400 into the coupling groove 120 of the upper rod 100. The attraction of the magnets 130 and 430 is used to locate the switch 400 at a preset position such that the coupling protrusion 411 is inserted into the coupling groove 120 provided at each position spaced apart from each other.

The sliding of the switch 400 on the upper rod 100 may be restrained by the magnetic attraction of the magnets 130 and 430. However, such magnetic attraction is relatively weak. In a case in which magnets 130 and 430 having strong magnetic attraction are used, it is difficult to change the position of the switch 400.

The magnet 430 may include a plurality of magnets provided in the switch 400 by being spaced apart from the coupling protrusion 411, and the magnet 130 of the upper rod 100 may be provided at a position corresponding to each of the plurality of magnets 430 provided in the switch 400 at a position of the switch 400 at which the coupling protrusion 411 of the switch 400 is inserted into the coupling groove 120 of the upper rod 100.

The magnets 130 and 430 may be located to be spaced apart from the coupling protrusion 411 such that the attraction of the magnets 130 and 430 does not prevent the removal of the coupling protrusion 411. Each of the magnets 130 and 430 includes a plurality of magnets located by being spaced apart from each other, so the switch 400 may be stably supported on the upper rod 100 due to the magnetic attraction.

As illustrated in the drawing, two magnets 430 may be provided in the switch 400 by being spaced apart from each other; the coupling grooves 120 are arranged in the upper rod 100 by being spaced apart by a predetermined distance from each other; and the magnet 130 may be provided at the position of the upper rod 100 corresponding to every position of the switch 400 at which the coupling protrusion 411 of the switch 400 is inserted into the coupling groove 120 of the upper rod 100. The magnets 130 of the upper rod 100 may be arranged at the same intervals as the intervals of the magnets 430 of switch 400, so the magnets 130 and 430 of the upper rod 100 and the switch 400 may be provided to partially overlap with each other.

The wearable chair may further include: a sliding part 230 coupled to the lower rod 200 to slide in a longitudinal direction thereof; the lower leg fixing part 210 coupled directly to the lower leg of the wearer; a first connection part 240 coupled to an upper part of the lower leg fixing part 210 at a first end thereof and coupled rotatably to the sliding part 230 at a second end thereof; and a second connection part 250 coupled rotatably to a lower part of the lower leg fixing part 210 at a first end thereof and coupled rotatably to a lower part of the lower rod 200 at a second end thereof.

The lower leg fixing part 210 may be coupled directly to the lower leg of the wearer through the harness. The lower leg fixing part 210 may be formed to be in close contact with the lower leg of the wearer.

The sliding part 230 is coupled to the lower rod 200 to slide in the longitudinal direction thereof, and is connected to the lower leg fixing part 210 through the first connection part 240. The first end of the first connection part 240 may be coupled securely to the upper part of the lower leg fixing part 210, and the second end of the first connection part 240 may be coupled rotatably to the sliding part 230. Contrarily, the first end of the first connection part 240 may be coupled rotatably to the upper part of the lower leg fixing part 210 and the second end of the first connection part 240 may be coupled securely to the sliding part 230

The second connection part 250 connects the lower leg fixing part 210 to the lower rod 200. The first end of the second connection part 250 may be coupled rotatably to the lower part of the lower leg fixing part 210 and the second end of the second connection part 250 may be coupled rotatably to the lower part of the lower rod 200.

According to the configuration, the lower leg fixing part 210 is coupled to the lower rod 200 to have a four-link structure. Accordingly, the lower leg fixing part 210 is coupled to the lower rod 200 such that the lower leg fixing part 210 stably slides in the longitudinal direction of the lower rod 200. As the lower leg fixing part 210 slides, distance between the lower leg fixing part 210 and the lower rod 200 may be changed.

Figure 6:
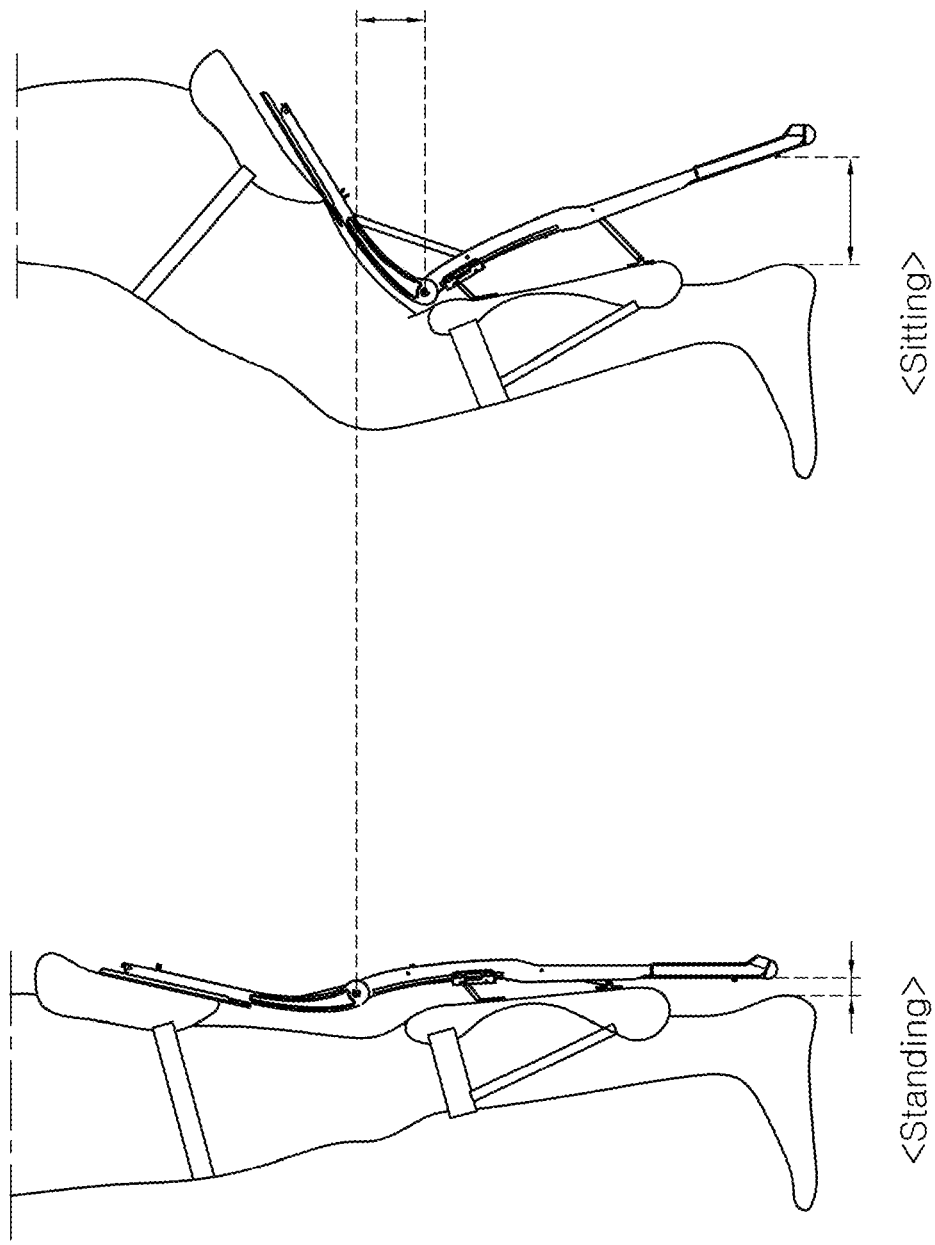
FIG. 6 illustrates a worn state of the wearable chair with a truss structure according to the embodiment of the present invention.

FIG. 6 illustrates a worn state of the wearable chair with a truss structure according to the embodiment of the present invention.

Referring to FIG. 6, According to such a configuration, in a case in which when the wearer sits, the lower rod 200 is lowered relative to the lower leg fixing part 210 and the lower end part 280 of the lower rod 200 is in contact with the ground, the lower end part of the lower rod 200 is located to be spaced apart from the wearer's foot by the four-link structure, whereby seating stability is improved.

In addition, the contact position of the lower end part 280 of the lower rod 200 with the ground constantly has a predetermined distance from the rear of the wearer's foot due to the four-link structure. That is, as the lower rod 200 is lowered when the wearer sits, the lower rod 200 is spaced apart from the rear surface of the lower leg of the wearer by the four-link structure. Accordingly, the contact position of the lower end part 280 of the lower rod 200 with the ground may be located to be spaced apart from the rear of the wearer's foot.

The lower rod 200 has a rail 205 formed thereon in the longitudinal direction thereof such that the sliding part 230 slides in the longitudinal direction of the lower rod 200 along the rail 205, and has a first elastic body 260 provided in the lower rod 200, the first elastic body applying elastic force to the sliding part 230 in a direction pulling the sliding part 230 downward.

That is, the sliding part 230 is coupled to the lower rod 200 such that the sliding part 230 slides in the rail 205 formed in the longitudinal direction of the lower rod 200, and the first elastic body 260 may be formed such that the sliding part 230 is pulled downward relative to the lower rod 200. The lower rod 200 may be pulled upward relative to the sliding part 230 by the elastic force of the first elastic body 260.

Accordingly, in a state in which a wearer's weight is not applied to the lower rod 200 in a wearer's standing posture, the lower rod 200 is pulled upward relative to the lower leg fixing part coupled to the lower leg of the wearer. Accordingly, in the wearer's standing posture, the lower end part 280 of the lower rod 200 is maintained to be raised from the ground such that the lower end part 280 of the lower rod 200 is not in contact with the ground, thereby minimizing the interference of the wearer's walking.

A second elastic body 290 may be provided in the lower rod 200, the second elastic body being fixed to the lower rod 200 at a first end thereof and coupled to the lower end part of the support rod 300 at a second end thereof and applying rotating force to the support rod 300 so as to rotate the support rod 300 in the same direction as the unfolding direction of the upper rod 100 relative to the lower rod 200.

The second elastic body 290 may apply the rotating force to the support rod 300 so as to rotate the support rod 300 in the same direction as the unfolding direction of the upper rod 100 relative to the lower rod 200. That is, as illustrated in the drawing, the second elastic body 290 applies the rotating force to the support rod 300 such that the support rod 300 is rotated counterclockwise relative to the lower end part of the support rod 300. The second elastic body 290 may apply the rotating force to the support rod 300 so as to rotate the upper end part of the support rod 300 in a direction toward the upper rod 100 such that the upper end part of the support rod 300 is constantly in contact with the upper rod 100.

As for a configuration to this end, the first end of the second elastic body 290 may be fixed to the lower rod 200, and the second end thereof may be coupled directly to the lower end part of the support rod 300. Alternatively, as illustrated in FIG. 1, the second end of the second elastic body 290 may be coupled indirectly to the lower end part of the support rod 300 through a separate component having a ring shape.

As for another embodiment, the wearable chair may have a coil-shaped spring, a first end of the spring being fixed to the lower rod 200 and covering the rotation center at which the support rod 300 rotates relative to the lower rod 200, and a second end of the spring being coupled to the lower end part of the support rod 300.

The rotating force of the second elastic body 290 does not apply enough strong elastic force to rotate the upper rod 100 relative to the lower rod 200, but applies enough elastic force to maintain the contact of the upper end part of the support rod 300 with the upper rod 100 during the sliding of the upper end part of the support rod 300 on the upper rod 100. Accordingly, the upper end part of the support rod 300 slides on the upper rod 100 in constant contact with the upper rod 100, and a second bearing 310 to be described later is in constant contact with the upper rod 100 such that the support rod 300 efficiently slides.

Figure 7A:
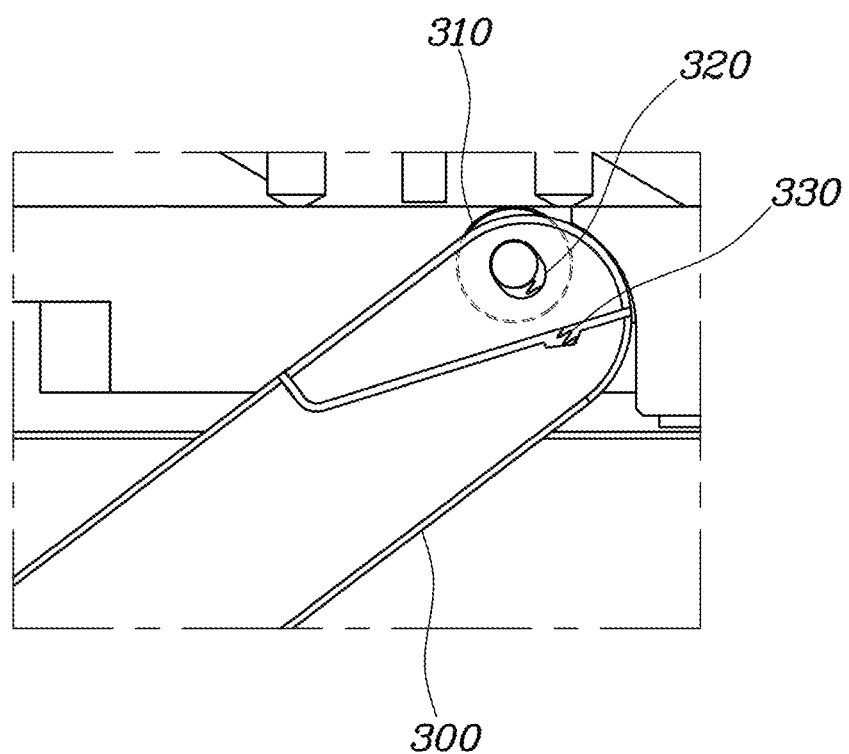
FIGS. 7a and 7b illustrate the upper end part of a support rod of the wearable chair with a truss structure according to the embodiment of the present invention.
Figure 7B:
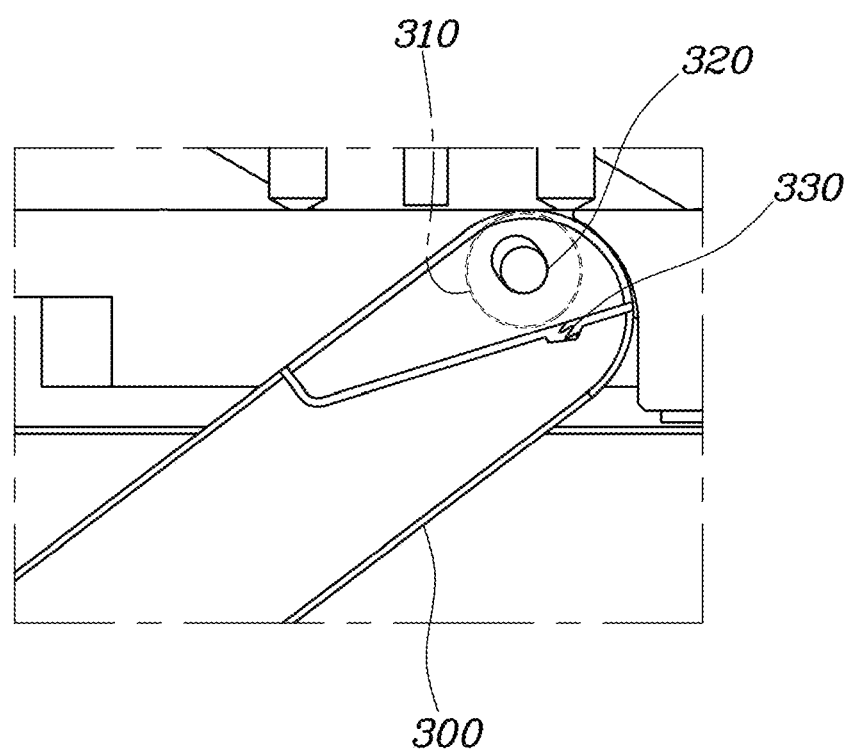

FIGS. 7a and 7b illustrate the upper end part of a support rod of the wearable chair with a truss structure according to the embodiment of the present invention.

Referring to FIGS. 7a and 7b, the second bearing 310 may be formed at the upper end part of the support rod 300, the second bearing being configured to rotate such that the support rod 300 slides along the upper rod 100. The second bearing 310 may be a bearing coupled to the upper end part of the support rod 300 such that the bearing rotates relative to a rotating shaft perpendicular to the longitudinal direction of the upper rod 100 along which the support rod 300 slides. Accordingly, during the sliding of the support rod 300 along the upper rod 100, the efficient movement of the support rod 300 can be performed due to the second bearing 310.

Particularly, the second bearing 310 may be coupled to the support rod 300 so as to move inside a pressing groove 320 formed at the upper end part of the support rod 300 such that the second bearing 310 is exposed to the outside of the support rod 300 in a direction toward the upper rod as illustrated in FIG. 7a or is inserted into the support rod 300 as illustrated in FIG. 7b.

In addition, a third elastic body 330 may be provided on the support rod 300, the third elastic body 330 pressing the second bearing 310 such that the second bearing 310 is exposed to the outside of the upper rod 100 along the pressing groove 320.

The second bearing 310 is coupled to the upper end part of the support rod 300, and may be coupled to an inner part of the pressing groove 320 such that the second bearing 310 partially moves relative to the support rod 300. The pressing groove 320 is formed in the upper end part of the support rod 300 such that the rotating shaft of the second bearing 310 moves in the pressing groove, and the second bearing 310 may move such that the second bearing 310 is exposed to the outside of the upper rod 100 from the inside of the pressing groove 320 or is inserted into the support rod 300.

The third elastic body 330 provided on the support rod 300 may apply elastic force to the second bearing 310 so as to press the second bearing 310 such that the second bearing 310 is exposed to the outside of the upper rod 100 along the pressing groove 320. Accordingly, when there is no separate external force, the second bearing 310 may be exposed to the outside of the upper rod 100 by the third elastic body 330.

Due to such a configuration, while the second bearing 310 is exposed to the outside of the upper end part of the support rod 300 by the third elastic body 330, the support rod 300 can efficiently slide along the upper rod 100. However, when the support rod 300 is pressed as when the wearer sits, the second bearing 310 overcomes the elastic force of the third elastic body 330 and is inserted into the support rod 300, so the second bearing 310 is protected so as not to be damaged by an external force.

Although the exemplary embodiment of the present invention has been described for illustrative purposes, those skilled in the art will appreciate that various modifications, additions and substitutions are possible, without departing from the scope and spirit of the present invention as disclosed in the accompanying claims.

| <Description of the Reference Numerals in the Drawings> | |
|---|---|
| 100: Upper rod | 200: Lower rod |
| 300: Support rod | 400: Switch |
| 410: Body part | 420: Rotation part |
| 421: First bearing | 130, 430: Magnet |
| 310: Second bearing | 500: Rotation center |

The invention claimed is:

1. A wearable chair with a truss structure, the wearable chair comprising:

an upper rod extending in a longitudinal direction thereof and connected to a wearer's thigh;

a lower rod extending in a longitudinal direction thereof and connected to a lower leg of the wearer, the lower rod being coupled to a lower end part of the upper rod at an upper end part of the lower rod such that the lower rod and the upper rod rotate relative to each other around a rotation center thereof, and being in contact with a ground at a lower end part of the lower rod when the wearer sits; and a support rod being slidably coupled to the upper rod at an upper end part of the support rod such that a position of the upper rod at which the upper end part of the support rod is prevented from sliding on the upper rod is changeable, and being rotatably coupled to the lower rod at a lower end part of the support rod so as to support a compression force between the upper rod and the lower rod in a longitudinal direction of the support rod when the wearer sits, wherein as the position of the upper rod at which the upper end part of the support rod is prevented from sliding on the upper rod is changed, a perpendicular line distance between the support rod and the rotation center of the upper rod and the lower rod is changed when the wearer sits.

2. The wearable chair of claim 1, wherein the upper end part and the lower end part of the support rod are coupled slidably to the upper rod and rotatably to the lower rod, respectively, such that the upper end part and the lower end part of the support rod are partially inserted into the upper rod and the lower rod, respectively.

3. The wearable chair of claim 2, wherein the lower rod is coupled to the upper rod to be rotatable inside the upper rod, and when the lower rod and the upper rod rotate relative to each other in directions folding over each other, the lower rod is partially inserted into the upper rod while the support rod is partially inserted into the lower rod.

4. The wearable chair of claim 1, further comprising:
a switch coupled to the upper rod such that the switch is able to slide in a longitudinal direction of the upper rod and to be held at each of a plurality of positions of the upper rod so as to be prevented from sliding,
wherein as the switch is held in the upper rod, the upper end part of the support rod is supported by the switch, and the support rod is prevented from sliding.

5. The wearable chair of claim 4, wherein a coupling protrusion protruding toward the upper rod is formed at a first end part of the switch, and coupling grooves are formed at the plurality of positions of the upper rod, whereby when the coupling protrusion is inserted into each of the coupling grooves, the switch is held in the upper rod such that the switch is prevented from sliding on the upper rod.

6. The wearable chair of claim 5, wherein the switch is composed of a body part having the coupling protrusion formed thereon and a rotation part coupled rotatably to the body part, the rotation part having a first bearing formed at a first end part thereof, wherein when the rotation part rotates relative to the body part, the first bearing is exposed to the protruding direction of the coupling protrusion and the coupling protrusion is removed from the coupling groove.

7. The wearable chair of claim 6, wherein a support is formed at the body part, the support protruding in direction opposite to the protruding direction of the coupling protrusion, and a second end part of the rotation part extends in an oblique direction to the support, so as the second end part of the rotation part is pressed toward the support, the rotation part is rotated relative to the body part.

8. The wearable chair of claim 5, wherein when inserting the coupling protrusion of the switch into the coupling groove of the upper rod, each of magnets producing attraction therebetween is provided in the switch and the upper rod such that the magnets face each other.

9. The wearable chair of claim 8, wherein the magnet of the switch comprises a plurality of magnets spaced apart from the coupling protrusion, and the magnet of the upper rod is provided at a position corresponding to each of the plurality of magnets provided in the switch at a position of the switch at which the coupling protrusion of the switch is inserted into the coupling groove of the upper rod.

10. The wearable chair of claim 1, further comprising:
a sliding part coupled to the lower rod to slide in a longitudinal direction thereof;
a lower leg fixing part coupled directly to the lower leg of the wearer;
a first connection part coupled to an upper part of the lower leg fixing part at a first end thereof and coupled rotatably to the sliding part at a second end thereof; and
a second connection part coupled rotatably to a lower part of the lower leg fixing part at a first end thereof and coupled rotatably to a lower part of the lower rod at a second end thereof.

11. The wearable chair of claim 10, wherein the lower rod has a rail formed thereon in the longitudinal direction thereof such that the sliding part slides in the longitudinal direction of the lower rod along the rail, and has a first elastic body provided in the lower rod, the first elastic body applying an elastic force to the sliding part in a direction pulling the sliding part downward.

12. The wearable chair of claim 1, wherein a second elastic body is provided in the lower rod, the second elastic body being fixed to the lower rod at a first end thereof and coupled to the lower end part of the support rod at a second end thereof and applying a rotating force to the support rod so as to rotate the support rod in the same direction as the unfolding direction of the upper rod relative to the lower rod.

13. The wearable chair of claim 1, wherein a second bearing is formed at the upper end part of the support rod, the second bearing being configured to rotate such that the support rod slides along the upper rod.

14. The wearable chair of claim 13, wherein the second bearing is coupled to the support rod so as to move inside a pressing groove formed at the upper end part of the support rod such that the second bearing is exposed to an outside of the support rod in a direction toward the upper rod or is inserted into the support rod, and
a third elastic body is provided on the support rod, the third elastic body pressing the second bearing such that the second bearing is exposed to an outside of the upper rod along the pressing groove.

\* \* \* \* \*